Patented Sept. 9, 1941

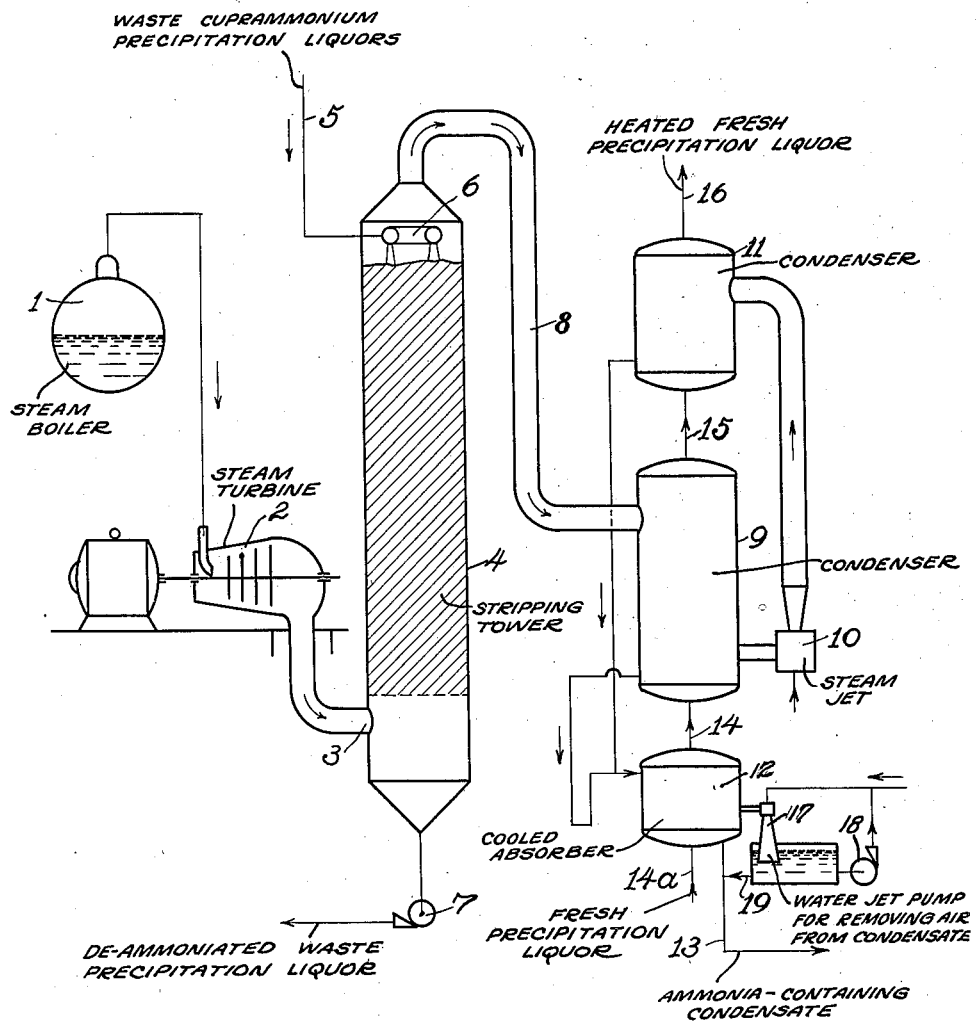

2,255,114

UNITED STATES PATENT OFFICE 2,255,114

PROCESS FOR THE RECOVERY OF AMMONIA FROM SPENT CUPRAMMONIUM SILK PRECIPITATION LIQUORS

Alfred Haltmeier, Cologne, Germany, assignor, by mesne assignments, to Walther H. Duisberg, New York, N. Y.

Application October 9, 1937, Serial No. 168,280
In Germany October 10, 1936

2 Claims. (Cl. 23—193)

The present invention relates to a process of recovering ammonia from used cuprammonium artificial silk precipitation liquors.

The spent precipitation liquors obtained in large quantities in the manufacture of cuprammonium artificial silk contain ammonia in a concentration of about 0.1 to 2 grams per liter and the heat values corresponding to a temperature of about 30 to 60° C. It has already been proposed to recover the ammonia contained in such waste liquors by means of a current of steam which is led in contact with and in opposite direction to the liquid trickling down in a suitable apparatus. However, it has thus far never appeared possible to thusly effect recovery of ammonia economically due to the extreme dilution in which the ammonia is present in the waste liquors. The expenses necessary, above all, the steam necessary for separation, are uniformly higher than the value of ammonia to be recovered.

I have now found that the ammonia from used cuprammonium artificial silk precipitation liquors can be economically recovered if the warm liquors are brought into counter-current contact with a current of steam having a pressure corresponding substantially to the vapor pressure of such liquors, said steam being released from a steam turbine working with condensation, and condensing the steam carrying the ammonia from the waste liquor in the condenser of the steam turbine while preferably using fresh precipitating liquor as cooling agent for this condenser. In this manner it is made possible to recover the ammonia from the waste liquors without it being necessary to produce steam for this purpose, since that steam is used for the ammonia recovering process which in the condensation power plant flows from the turbine into the condenser. This flowing steam of the condensation power plant is charged with ammonia, which is recovered in the condensation.

The process of the present invention is made possible by the surprising fact that the pressure of the steam which is necessary as the conveyer and concentration agent for such ammonia need not be high, but it is even favorable that it is as low as possible. It has been found, that the quantity of steam necessary for carrying a given quantity of ammonia from the waste liquors is the smaller the lower the steam pressure. Since the difference between the temperature of the waste liquor and that of the water condensate of a steam power plant is fairly small, the actual loss of energy involved in the present process is likewise very slight. In some cases, the fresh precipitating liquor has been used as cooling agent in the condensers of power plants of cuprammonium artificial silk factories, whereby the liquor is heated to precipitating temperature. In comparing the present process with that method, it will be noted that no additional steam has to be produced, and that furthermore the ammonia of the waste liquor which up to now has been lost is recovered.

The accompanying flow sheet illustrates schematically the recovery of ammonia from used precipitation liquors.

The process of the invention is, for instance, as follows:

The steam which is produced for the power generation under high pressure in a steam boiler 1 is released in a steam turbine 2, to a pressure corresponding substantially to the vapor pressure of the used cuprammonium precipitation liquors and being preferably below or equal to it. The steam enters the counter-current apparatus 4 at 3 in which apparatus it streams upward and is thereby charged with ammonia from the precipitation liquors. The used precipitation liquors enter the counter-current apparatus through pipe 5, are distributed by means of a distributing device 6 over and throughout the cross section thereof and trickle over filler bodies or are finely divided by any other distributing devices, coming in this manner into close contact with the steam taking up the ammonia. The extracted liquor collects in the lower portion of the counter-current apparatus. It is then conveyed by pump 7 to a copper recovery apparatus. The steam carrying the ammonia leaves the counter-current apparatus at the top and runs through pipe 8 into the condenser 9 in which it may be completely or partially condensed as pointed out hereinafter. Fresh precipitation liquor necessary for the precipitation of the cuprammonium silk serves as cooling liquid for the condenser 9. Such fresh liquor is heated due to the absorption of the condensation heat of the steam carrying the ammonia. The temperature of the liquor is so much lower than the saturation temperature of the steam to be condensed as corresponds to the temperature gradient necessary for the transmission of the heat. Since this temperature gradient is small there remains a certain excess heat of condensation which cannot be transmitted to the fresh precipitation liquor. This amount of heat can either be transmitted to crude cold water and lost or can be raised to a higher temperature level by means of a heating means, for example, the steam jet 10 and then made useful in a further condenser 11 for the further heating of the fresh precipitation water which must be brought to precipitating temperature. In a cooled absorber 12 which is connected with both condensers 9 and 11 the condensates from both condensers 9 and 11 are cooled so strongly in the presence of the remaining steam-ammonia mixture that all of the ammonia present is dissolved. The condensates resulting in condensers 9 and 11 are caused to flow to the absorber 12 by overcoming the pressure difference existing between chambers 11 and 12 on the one hand and that of chamber 9 on the other hand by means of a pump or gravity gradient. In a further rectification column (not shown) the ammonia-containing condensate which emerges at 13 from the absorber 12 may be brought to the higher concentration which is necessary for preparing the cuprammonium spinning solution. In this case it is advantageous to use the waste heat of such further rectification apparatus for heating the fresh precipitation liquor, for example, by cooling the reflux- and end-condensers of such rectification apparatus by divided streams of fresh precipitation liquor. Through pipes 14a and 14 such partially warmed fresh precipitation liquor then enters into the condenser 9, runs therefrom through pipe 15 into the condenser 11 and leaves the latter through pipe 16, at the same time absorbing the heat from the rectification apparatus.

For removal of air entering the condensers 9 and 11 from the exterior or with the condensing steam, a vacuum pump such as for instance a water jet pump 17 or a rotation vacuum pump can be used advantageously, the circulating water of which is pumped out through pipe 18, while the ammonia residues which are contained in the air are dissolved in water. By adding fresh water and correspondingly withdrawing of ammonia solution the circulating water can be maintained at an ammonia concentration which is very near to its saturation concentration under the pressure at the place of suction. The small quantity of ammonia solution flowing off from the pump circulation is carried through the pipe 19 to pipe 13 leading to the rectification apparatus.

I claim:

1. The process for simultaneously recovering the ammonia contained in spent cuprammonium silk precipitation liquors and heating of fresh cuprammonium silk precipitation liquors which comprises expanding steam in a steam turbine working with condensation to a pressure corresponding substantially to the vapor pressure of the spent cuprammonium precipitation liquors at the temperature of about 30°–60° C. they have after the cuprammonium silk precipitation treatment, bringing said steam into direct counter-current contact with the spent cuprammonium precipitation liquors and condensing the steam carrying the ammonia together with the ammonia by bringing it in heat exchange with the fresh cuprammonium precipitation liquors.

2. The process for simultaneously recovering the ammonia contained in spent cuprammonium silk precipitation liquors and heating of fresh cuprammonium silk precipitation liquors which comprises expanding steam in a steam turbine working with condensation to a pressure corresponding substantially to the vapor pressure of the spent cuprammonium precipitation liquors at the temperature of about 30° to 60° C. they have after the cuprammonium silk precipitation treatment, bringing said steam into direct counter-current contact with the spent cuprammonium precipitation liquors and condensing the steam carrying the ammonia together with the ammonia by bringing it in heat exchange with the fresh cuprammonium precipitation liquors, and bringing a part of the steam and ammonia before condensing it to a higher pressure and a higher temperature and then condensing it in a second condensation stage by bringing it in heat exchange with the fresh cuprammonium precipitation liquors heated in the first condensation stage.

ALFRED HALTMEIER.